(12) United States Patent
Murakami et al.

(10) Patent No.: US 8,101,296 B2
(45) Date of Patent: Jan. 24, 2012

(54) BATTERY HAVING A CHARGE VOLTAGE BETWEEN 4.25 V AND 6.00 V

(75) Inventors: Takashi Murakami, Fukushima (JP); Tadahiko Kubota, Kanagawa (JP)

(73) Assignee: Sony Corporation, Tokyo (JP)

( * ) Notice: Subject to any disclaimer, the term of this patent is extended or adjusted under 35 U.S.C. 154(b) by 212 days.

(21) Appl. No.: 12/015,314

(22) Filed: Jan. 16, 2008

(65) Prior Publication Data

US 2008/0193834 A1 Aug. 14, 2008

(30) Foreign Application Priority Data

Feb. 9, 2007 (JP) ................................. 2007-030930

(51) Int. Cl.
*H01M 6/04* (2006.01)

(52) U.S. Cl. ..... 429/188; 429/129; 429/199; 429/218.1; 429/220; 429/221; 429/223; 429/224; 429/498; 429/523

(58) Field of Classification Search .................. 429/188, 429/199, 498
See application file for complete search history.

(56) References Cited

U.S. PATENT DOCUMENTS

| | | | |
|---|---|---|---|
| 3,536,796 A | 10/1970 | Rock | |
| 5,296,319 A | 3/1994 | Bito et al. | |
| 2003/0165739 A1* | 9/2003 | Kizu et al. | 429/231.3 |
| 2004/0234853 A1 | 11/2004 | Adachi et al. | |
| 2005/0037257 A1* | 2/2005 | Akashi et al. | 429/144 |
| 2006/0099495 A1* | 5/2006 | Suzuki et al. | 429/128 |
| 2006/0115739 A1 | 6/2006 | Yamaguchi et al. | |
| 2006/0134528 A1* | 6/2006 | Ihara et al. | 429/329 |
| 2007/0166617 A1* | 7/2007 | Gozdz et al. | 429/231.95 |
| 2009/0142663 A1* | 6/2009 | Takeuchi et al. | 429/188 |

FOREIGN PATENT DOCUMENTS

| | | |
|---|---|---|
| JP | 57-49629 | 3/1982 |
| JP | 8-4015 | 1/1996 |
| JP | 2697365 | 9/1997 |
| JP | 2000-268859 | 9/2000 |
| JP | 2003-331824 | 11/2003 |
| JP | 2003-331915 | 11/2003 |
| JP | 2003-338317 | 11/2003 |
| JP | 2004-022174 | 1/2004 |
| JP | 2004-022336 | 1/2004 |
| JP | 3658517 | 3/2005 |
| JP | 2006-066320 | 3/2006 |
| JP | 2006-156331 | 6/2006 |
| JP | 2006-294373 | 10/2006 |
| JP | 2006-331943 | 12/2006 |
| JP | 2007-018772 | 1/2007 |
| JP | 2007-026959 | 2/2007 |
| WO | 03/019713 | 3/2003 |
| WO | WO 2007010915 * | 1/2007 |

OTHER PUBLICATIONS

Japanese Office Action (for JP 2007-030930) issued on Jan. 20, 2009.

* cited by examiner

*Primary Examiner* — Patrick Ryan
*Assistant Examiner* — Ladan Mohaddes
(74) *Attorney, Agent, or Firm* — K&L Gates LLP

(57) ABSTRACT

A battery having a cathode, an anode, an electrolytic solution, and a separator is provided. An open circuit voltage per pair of cathode and anode in a perfect charging state lies within a range from 4.25V or more to 6.00V or less. The electrolytic solution contains: an additive of at least one kind selected from a group consisting of an acid anhydride and its derivative; and cyclic carbonic ester derivative having a halogen atom.

8 Claims, 6 Drawing Sheets

BATTERY HAVING A CHARGE VOLTAGE BETWEEN 4.25 V AND 6.00 V

CROSS REFERENCES TO RELATED APPLICATIONS

The present application claims priority to Japanese Patent Application No. 2007-030930 filed in the Japanese Patent Office on Feb. 9, 2007, the entire contents of which is being incorporated herein by reference.

BACKGROUND

The present application relates to a battery and, more particularly, to a battery in which an open circuit voltage per pair of cathode and anode in a perfect charging state is equal to or larger than 4.25V.

In recent years, techniques for portable electronic apparatuses have remarkably been developed. Electronic apparatuses such as cellular phone, notebook-sized computer, and the like have been started to be recognized as fundamental technologies for supporting an advanced information society. Studies and developments regarding a technique for realizing advanced functions of those electronic apparatuses are vigorously being progressed. In proportion to it, electric power consumption of those electronic apparatuses is increasing more and more. On the contrary, since it is demanded that those electronic apparatuses can be driven for a long time, it is inevitably demanded to realize a high energy density of a secondary battery serving as a driving power source. It is also demanded to elongate a cycle life in consideration of an environmental view.

The higher energy density of the battery is preferable from viewpoints of an occupation volume, a mass, and the like of the battery built in the electronic apparatus. At present, since a lithium ion secondary battery has an excellent energy density, such batteries have been built in most of the apparatuses.

Ordinarily, in the lithium ion secondary battery, lithium cobalt acid is used for a cathode and a carbon material is used for an anode. An operating voltage is set to a value within a range from 4.2V to 2.5V. A terminal voltage in a cell can be raised up to 4.2V mainly owing to an excellent electrochemical stability of a non-aqueous electrolyte material, a separator, or the like.

In the lithium ion secondary battery in the related art which operates at the maximum voltage of 4.2V, a cathode active material such as lithium cobalt acid or the like which is used for the cathode uses a capacitance of at most about sixty percent of its theoretical capacitance. Therefore, a residual capacitance can be utilized in principle by further raising a charge voltage. It has actually been known that the high energy density can be realized by setting the voltage upon charging to 4.25V or more (for example, refer to Patent Document 1: International Publication No. WO03/019713).

However, in the battery whose charge voltage has been set to 4.25V or more, particularly, an oxidation atmosphere near the cathode surface is enhanced, so that an electrolytic solution which physically comes into contact with the cathode is oxidation decomposed and charge/discharge efficiency deteriorates. Further, when a reaction to the electrolytic solution on the anode side continues, conductivity of a coating deteriorates, metal lithium is precipitated on the anode due to an excessive doping of lithium, and cycle characteristics deteriorate.

Particularly, if the charge voltage is set to 4.25V or more, when the cycle is repeated, a capacitance maintaining ratio deteriorates suddenly and there is a case where it is difficult to predict the residual capacitance and sufficiently effect an advantage obtained by increasing the capacitance owing to the high charge voltage. Since it is difficult to sufficiently suppress such a sudden deterioration occurring after the elapse of predetermined cycles according to the electrolytic solution or the like constructing the battery in the related art, it is necessary to newly examine constructing materials such as an electrolytic solution and the like.

SUMMARY

It is, therefore, desirable to provide a battery having good cycle characteristics even if a charge voltage is set to 4.25V or more.

According to an embodiment, there is provided a battery comprising a cathode, an anode, an electrolytic solution, and a separator, wherein an open circuit voltage per pair of cathode and anode in a perfect charging state lies within a range from 4.25V or more to 6.00V or less, and the electrolytic solution contains: an additive of at least one kind selected from a group consisting of an acid anhydride and its derivative; and a cyclic carbonic ester derivative having a halogen atom.

According to the embodiment, since the open circuit voltage in the perfect charging state is set to the value within the range from 4.25V or more to 6.00V or less, a high energy density can be obtained. Since the electrolytic solution contains the additive of at least one kind selected from the group consisting of the acid anhydride and its derivative, upon charging and discharging, a coating based on the additive is formed on the anode and a decomposition of the electrolytic solution can be suppressed. Further, since the electrolytic solution contains the cyclic carbonic ester derivative having the halogen atom, a higher effect can be obtained.

According to the embodiment, even if the charge voltage is set to 4.25V or more, the good cycle characteristics can be effected.

Additional features and advantages are described herein, and will be apparent from, the following Detailed Description and the figures.

DETAILED DESCRIPTION

The present application will be described in detail hereinbelow with reference to the drawings according to an embodiment.

Figure 1:
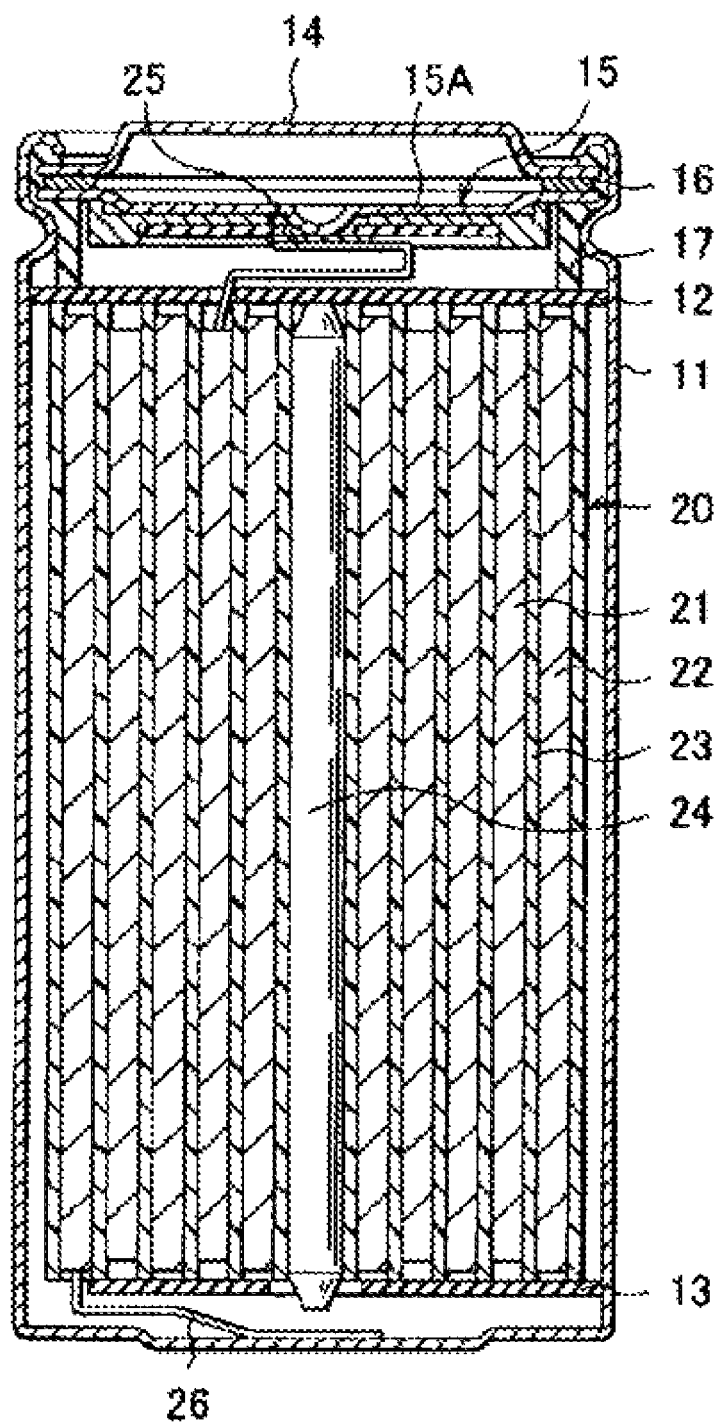
FIG. 1 is a cross sectional view showing a construction of a battery according to the first embodiment.

FIG. 1 shows a cross sectional structure of a battery according to the first embodiment. This battery is, for example, a non-aqueous electrolyte secondary battery and is, for example, what is called a lithium ion secondary battery in which lithium Li is used as an electrode reactive substance and a capacitance of an anode is expressed by a capacitance component due to doping and dedoping of lithium Li.

This battery is what is called a cylindrical type and is constructed in such a manner that a winded electrode member 20 in which a pair of belt-shaped cathode 21 and belt-shaped anode 22 have been wound through a separator 23 is assembled in an almost hollow cylindrical battery can 11. The battery can 11 is made of, for example, iron Fe plated with nickel Ni. One end portion of the battery can is closed and the other end portion is open. A pair of insulating plates 12 and 13 are arranged in the battery can 11 so as to sandwich the winded electrode member 20 in such a manner that the insulating plates 12 and 13 are positioned perpendicularly to a winding peripheral surface.

A battery cap 14, a relief valve mechanism 15 and a PTC (Positive Temperature Coefficient) element 16 provided in the battery cap 14 are caulked through a gasket 17 and attached to the open end portion of the battery can 11. The inside of the battery can 11 is sealed.

The battery cap 14 is made of, for example, a material similar to that of the battery can 11. The relief valve mechanism 15 is electrically connected to the battery cap 14 through the PTC element 16. When an inner pressure of the battery increases to a predetermined value or more by an internal short-circuit, heating from an outside, or the like, a disk plate 15A is reversed, thereby disconnecting the electrical connection between the battery cap 14 and the winded electrode member 20. When a temperature rises, the PTC element 16 limits a current by an increase in resistance value, thereby preventing abnormal heat generation caused by the large current. The gasket 17 is made of, for example, an insulating material and its surface has been coated with asphalt.

For example, a center pin 24 has been inserted to the center of the winded electrode member 20. A cathode lead 25 made of aluminum Al or the like has been connected to the cathode 21 of the winded electrode member 20. An anode lead 26 made of nickel Ni or the like has been connected to the anode 22. The cathode lead 25 is welded to the relief valve mechanism 15, so that it is electrically connected to the battery cap 14. The anode lead 26 is welded and electrically connected to the battery can 11.

Figure 2:
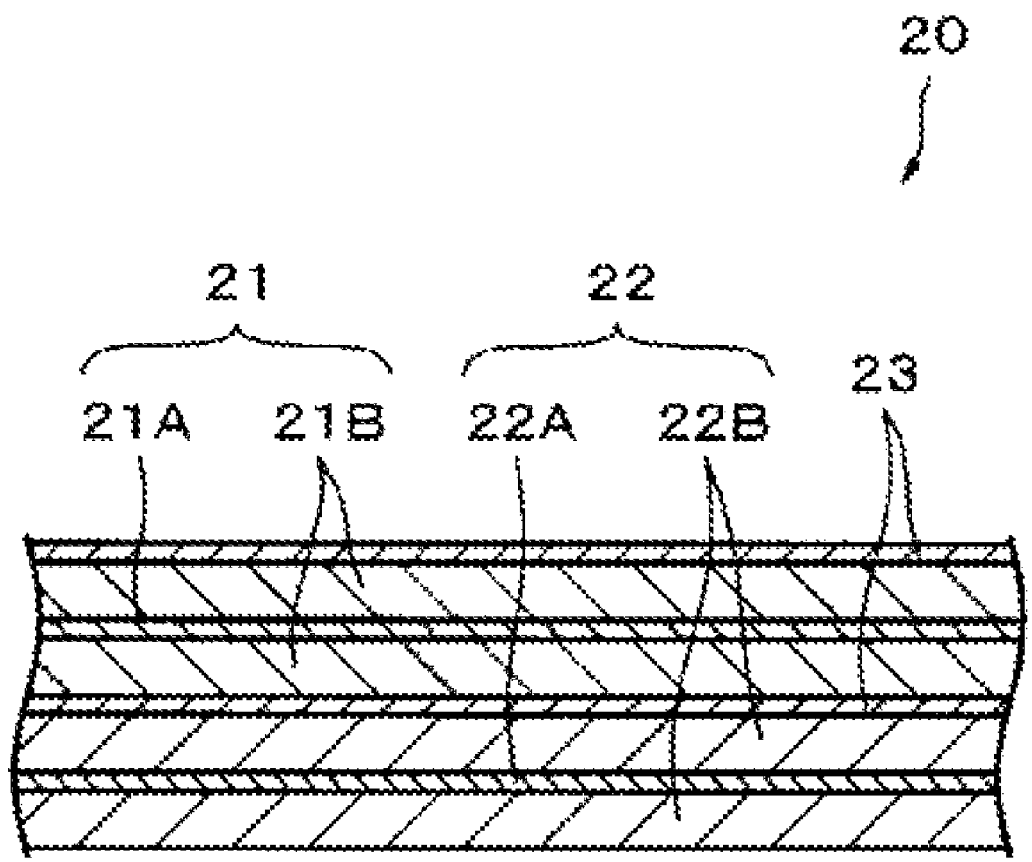
FIG. 2 is a cross sectional view enlargedly showing a part of a winded electrode member in the battery shown in FIG. 1.

FIG. 2 is a cross sectional view enlargedly showing a part of the winded electrode member 20 shown in FIG. 1. The cathode 21 has a structure in which, for example, cathode active material layers 21B are formed on both surfaces of a cathode collector 21A having a pair of opposite surfaces. Although not shown, an area where the cathode active material layer 21B exists only on one surface of the cathode collector 21A may be provided. The cathode collector 21A is made of, for example, metal foil such as aluminum foil or the like. As a cathode active material, for example, the cathode active material layer 21B contains one, two, or more kinds of cathode materials which can dope and dedope lithium Li. The cathode active material layer 21B contains a conductive material such as graphite or the like and a binder such as polyvinylidene fluoride or the like as necessary.

As a cathode material which can dope and dedope lithium Li, for example, a lithium composite oxide expressed by mean compositions shown by Formula I, more specifically, a lithium composite oxide having a stratified rocksalt type structure expressed by mean compositions shown by one of Formulae II to IV can be preferably mentioned. An energy density can be raised by using such a lithium composite oxide. As specific examples of such a lithium composite oxide, there are $Li_aCoO_2$ ($a \approx 1$), $Li_{c1}Ni_{c2}Co_{1-c2}O_2$ ($c1 \approx 1$, $0 < c2 < 0.5$), and the like.

$$Li_pNi_{(1-q-r)}Mn_qM1_rO_{(2-y)}X_z \quad \text{(Formula I)}$$

(in the Formula: M1 denotes at least one kind of elements selected from Groups 2 to 15 excluding nickel Ni and manganese Mn; X denotes at least one kind of elements selected from Group-16 elements and Group-17 elements other than oxygen O; and p, q, r, y, and z indicate values within ranges of $0 \leq p \leq 1.5$, $0 \leq q \leq 1.0$, $0 \leq r \leq 1.0$, $-0.10 \leq y \leq 0.20$, and $0 \leq z \leq 0.2$, respectively.)

$$Li_rCo_{(1-s)}M3_sO_{(2-t)}F_u \quad \text{(Formula II)}$$

(in the Formula: M3 denotes at least one kind selected from a group consisting of nickel Ni, manganese Mn, magnesium Mg, aluminum Al, boron B, titanium Ti, vanadium V, chromium Cr, iron Fe, copper Cu, zinc Zn, molybdenum Mo, tin Sn, calcium Ca, strontium Sr, and tungsten W; r, s, t, and u indicate values within ranges of $0.8 \leq r \leq 1.2$, $0 \leq s \leq 0.5$, $-0.1 \leq t \leq 0.2$, and $0 \leq u \leq 0.1$, respectively; compositions of lithium Li differ depending on the charging/discharging state; and the value of r indicates a value in the perfect discharging state.)

$$Li_fMn_{(1-g-h)}Ni_gM1_hO_{(2-j)}F_k \quad \text{(Formula III)}$$

(in the Formula: M1 denotes at least one kind selected from a group consisting of cobalt Co, magnesium Mg, aluminum Al, boron B, titanium Ti, vanadium V, chromium Cr, iron Fe, copper Cu, zinc Zn, zirconium Zr, molybdenum Mo, tin Sn, calcium Ca, strontium Sr, and tungsten W; f, g, h, j, and k indicate values within ranges of $0.8 \leq f \leq 1.2$, $0 < g < 0.5$, $0 \leq h \leq 0.5$, $g+h<1$, $-0.1 \leq j \leq 0.2$, and $0 \leq k \leq 0.1$, respectively; the compositions of lithium differ depending on the charging/discharging state; and the value of f indicates a value in the perfect discharging state.)

$$Li_mNi_{(1-n)}M2_nO_{(2-p)}F_q \quad \text{(Formula IV)}$$

(in the Formula: M2 denotes at least one kind selected from a group consisting of cobalt Co, manganese Mn, magnesium Mg, aluminum Al, boron B, titanium Ti, vanadium V, chromium Cr, iron Fe, copper Cu, zinc Zn, molybdenum Mo, tin Sn, calcium Ca, strontium Sr, and tungsten W; m, n, p, and q indicate values within ranges of $0.8 \leq m \leq 1.2$, $0.005 \leq n \leq 0.5$, $-0.1 \leq p \leq 0.2$, and $0 \leq q \leq 0.1$, respectively; the compositions of lithium differ depending on the charging/discharging state; and the value of m indicates a value in the perfect discharging state.)

As other cathode materials, for example, a lithium composite oxide having a spinel type structure expressed by the mean compositions shown by Formula V can be mentioned. For example, the following materials can be also mentioned: a lithium composite phosphate having an olivin type structure expressed by the mean compositions shown by Formula VI, more specifically, Formula VII; a sulfide such as iron disulfide, titanium disulfide, molybdenum sulfide, or the like; and an oxide such as titanium oxide, vanadium oxide, manganese dioxide, or the like.

$$Li_vM_{n(2-w)}M4_wO_xF_y \quad \text{(Formula V)}$$

(in the Formula: M4 denotes at least one kind selected from a group consisting of cobalt Co, nickel Ni, magnesium Mg, aluminum Al, boron B, titanium Ti, vanadium V, chromium Cr, iron Fe, copper Cu, zinc Zn, molybdenum Mo, tin Sn, calcium Ca, strontium Sr, and tungsten W; v, w, x, and y indicate values within ranges of $0.9 \leq v \leq 1.1$, $0 \leq w \leq 0.6$, $3.7 \leq x \leq 4.1$, and $0 \leq y \leq 0.1$, respectively; the compositions of lithium Li differ depending on the charging/discharging state; and the value of v indicates a value in the perfect discharging state.)

$$Li_aM2_bPO_4 \quad \text{(Formula VI)}$$

(in the Formula: M2 denotes at least one kind of elements selected from Groups 2 to 15; and a and b indicate values within ranges of $0 \leq a \leq 2.0$ and $0.5 \leq b \leq 2.0$, respectively.)

$$Li_zM5PO_4 \quad \text{(Formula VII)}$$

(in the Formula: M5 denotes at least one kind selected from a group consisting of cobalt Co, manganese Mn, iron Fe, nickel Ni, magnesium Mg, aluminum Al, boron B, titanium Ti, vanadium V, niobium Nb, copper Cu, zinc Zn, molybdenum Mo, calcium Ca, strontium Sr, tungsten W, and zirconium Zr; z indicates a value within a range of $0.9 \leq z \leq 1.1$; the compositions of lithium Li differ depending on the charging/discharging state; and the value of z indicates a value in the perfect discharging state.)

Compositions of the inside of the cathode material and compositions of its surface may differ. For example, a coating layer of another cathode material can be formed on the surface of the foregoing cathode material. More specifically speaking, a cathode material in which a coating layer made of an oxide containing lithium Li, nickel Ni, and manganese Mn is formed in at least a part of a lithium composite oxide particle can be mentioned.

The coating layer is a layer which has composition elements or a composition ratio different from those (that) of the inside of the cathode material. At least a part of the surface of the inside is covered with the coating layer. In the case where the coating layer is made of the oxide containing lithium Li, nickel Ni, and manganese Mn as mentioned above, concentration of each of nickel Ni and manganese Mn in the coating layer changes in the depth direction. It is preferable that the concentration of manganese Mn in an outer layer portion on the side opposite to an inner layer portion of the composite oxide particle side is larger than that in the inner layer portion. This is because the charge/discharge efficiency can be further improved by setting the concentration of manganese Mn in the outer layer portion to be larger than the mean compositions of the coating layer as mentioned above.

The coating layer denotes an area in a range from the surface of the lithium composite oxide particle having the coating layer to a portion where there is no substantial concentration change in the case where the concentration change of the component elements is examined in the direction from the surface of the lithium composite oxide particle toward the inside thereof. The concentration change of each of nickel and manganese in the direction from the surface toward the inside of the particle in the lithium composite oxide particle having the coating layer can be detected by a method whereby, for example, while scraping the lithium composite oxide particle having the coating layer by sputtering or the like, its compositions are measured by an AES (Auger Electron Spectroscopy) or an SIMS (Secondary Ion Mass Spectrometry). The concentration change can be also detected by a method whereby the lithium composite oxide particle having the coating layer is slowly dissolved in an acid solution or the like and a time change of its effluent is measured by an ICP (Inductively Coupled Plasma) spectral analysis or the like.

It is preferable that a composition ratio of nickel Ni and manganese Mn in the coating layer lies within a range from (95:5) to (20:80) as a mole ratio of nickel Ni and manganese Mn, much preferably, a range from (90:10) to (30:70). This is because if an amount of manganese Mn is large, a doping amount of lithium Li in the coating layer decreases, a capacitance decreases, and an electric resistance increases, and if the amount of manganese Mn is small, it is difficult to sufficiently improve the charge/discharge efficiency.

The oxide of the coating layer can further contain at least one kind, as a component element, selected from a group consisting of magnesium Mg, aluminum Al, boron B, titanium Ti, vanadium V, chromium Cr, iron Fe, cobalt Co, copper Cu, zinc Zn, molybdenum Mo, tin Sn, tungsten W, zirconium Zr, yttrium Y, niobium Nb, calcium Ca, and strontium Sr. This is because stability of the cathode material can be further improved and diffusibility of lithium ions can be further improved.

For example, as a cathode material in which the coating layer is formed in at least a part of the lithium composite oxide particle, as disclosed in the Official Gazette of Japanese Patent No. 3543437, a composite particle in which the surface of a core particle made of the lithium composite oxide particle has been covered with a microparticle made of the lithium composite oxide particle can be mentioned. By using such a composite particle, high electrode filling performance and more excellent cycle characteristics can be obtained.

More specifically, the cathode material is made by, for example, a composite particle in which the surface of the lithium composite oxide particle serving as a core particle and shown by one of Formulae I to VII has been covered with a microparticle of at least one kind of the lithium composite oxide shown by Formula I or VI, more specifically, $Li_xCO_2$, $Li_xNiO_2$, $Li_xMn_2O_4$, $Li_xCo_{1-y}M_yO_2$, $Li_xNi_{1-y}M_yO_2$, or LixMn1-yMyO2 (where, M denotes an element of at least one kind selected from titanium Ti, vanadium V, chromium Cr, manganese Mn, iron Fe, aluminum Al, cobalt Co, nickel Ni, copper Cu, zinc Zn, molybdenum Mo, bismuth Bi, and boron B; and x and y indicate values within ranges of $0 < x \leq 1.2$ and $0 < y < 1$, respectively) and the lithium composite oxide shown by Formula VII.

As a method of covering the surface of the core particle made of the lithium composite oxide particle with the microparticle of the lithium composite oxide, for example, a high speed rotational impact blending can be mentioned. The high speed rotational impact blending is a method whereby a mixture obtained by uniformly mixing the powder and the microparticle is dispersed into a high speed air current and the impacting operation is repetitively executed, thereby applying a mechanical thermal energy to the powder. By this operation, a state where the microparticle has uniformly and closely been adhered onto the surface of the powder is obtained and the powder surface is reformed.

The anode 22 has a structure in which, for example, anode active material layers 22B are formed on both surfaces of an anode collector 22A having a pair of opposite surfaces. Although not shown, the anode active material layer 22B can be also formed only on one surface of the anode collector 22A. The anode collector 22A is made of, for example, metal foil such as copper foil or the like.

As an anode active material, the anode active material layer 22B contains one, two, or more kinds of anode materials which can dope and dedope lithium Li.

As anode materials which can dope and dedope lithium, for example, carbon materials such as non-easy-graphitizable carbon, easy-graphitizable carbon, graphite, pyrolytic carbon class, coke class, glassy carbon class, organic high molecular compound baked material, carbon fiber, activated charcoal, and the like can be mentioned. Among them, there is a pitch coke, a needle coke, a petroleum coke, or the like as a coke class. The organic high molecular compound baked material denotes a material obtained by baking the high molecular material such as phenol resin, fran resin, or the like at a proper temperature and carbonating it. A part of those materials are classified into the non-easy-graphitizable carbon or the easy-graphitizable carbon. Those carbon materials are preferable because a change in crystal structure which occurs upon charging or discharging is very small, the high charge/discharge capacitance can be obtained, and good cycle characteristics can be obtained. Among those carbon materials, the material whose charge/discharge electric potential is low, specifically speaking, the material whose charge/discharge electric potential is relatively close to that of the lithium metal is preferable because the high energy density of the battery can be easily realized. Particularly, the graphite is preferable because an electrochemical equivalent is large and the high energy density can be obtained. The non-easy-graphitizable carbon is preferable because the excellent cycle characteristics can be obtained.

As an anode material which can dope and dedope lithium Li, a material which can dope and dedope lithium Li and contains at least one kind of elements between the metal element and the semimetal element as a component element can be also mentioned. This is because if such a material is used, the high energy density can be obtained. Particularly, if such a material is used together with the carbon material, it is much preferable because the high energy density can be obtained and the excellent cycle characteristics can be obtained. The anode material may be a simple substance, an alloy, or a compound of the metal element or semimetal element. A material in which at least a part has one, two, or more kinds of phases of them can be also used. In the application, as alloys, in addition to an alloy made of two or more kinds of metal elements, an alloy containing one or more kinds of metal elements and one or more kinds of semimetal elements is also incorporated. The alloy may contain a nonmetal element. As its texture, there is a solid solution, an eutectic (eutectic mixture), an intermetallic compound, or a texture in which two or more kinds of them coexist.

As a metal element or a semimetal element constructing the anode material, for example, magnesium Mg, boron B, aluminum Al, gallium Ga, indium In, silicon Si, germanium Ge, tin Sn, lead Pb, bismuth Bi, cadmium Cd, silver Ag, zinc Zn, hafnium Hf, zirconium Zr, yttrium Y, palladium Pd, or platinum Pt can be mentioned. They may be either crystalline or amorphous.

Among them, as an anode material, a material containing a metal element or a semimetal element of Group 4B in a short period type periodic table as a component element is preferable. A material containing at least either silicon Si or tin Sn as a component element is particularly preferable. This is because according to silicon Si and tin Sn, an ability of doping and dedoping lithium Li is high and the high energy density can be obtained.

As an alloy of tin Sn, for example, an alloy containing, as a second component element other than tin Sn, at least one kind selected from a group consisting of silicon Si, nickel Ni, copper Cu, iron Fe, cobalt Co, manganese Mn, zinc Zn, indium In, silver Ag, titanium Ti, germanium Ge, bismuth Bi, antimony Sb, and chromium Cr can be mentioned. As an alloy of silicon Si, for example, an alloy containing, as a second component element other than silicon Si, at least one kind selected from a group consisting of tin Sn, nickel Ni, copper Cu, iron Fe, cobalt Co, manganese Mn, zinc Zn, indium In, silver Ag, titanium Ti, germanium Ge, bismuth Bi, antimony Sb, and chromium Cr can be mentioned.

As a compound of tin Sn or a compound of silicon Si, for example, a compound containing oxygen O or carbon C can be mentioned. In addition to tin Sn or silicon Si, the foregoing second component element can be also contained.

Among them, as an anode material, it is preferable to use a CoSnC-containing material in which tin Sn, cobalt Co, and carbon are contained as component elements, a content of carbon lies within a range from 9.9 mass % or more to 29.7 mass % or less, and a ratio of a content of cobalt Co to the sum of a content of tin Sn and the content of cobalt Co lies within a range from 30 mass % or more to 70 mass % or less. This is because in such a composition range, the high energy density can be realized and the excellent cycle characteristics can be obtained.

The CoSnC-containing material may further contain another component element as necessary. As another component element, for example, silicon Si, iron Fe, nickel Ni, chromium Cr, indium In, niobium Nb, germanium Ge, titanium Ti, molybdenum Mo, aluminum Al, phosphorus P, gallium Ga, or bismuth Bi is preferable. Two or more kinds of them can be also contained. This is because the capacitance or the cycle characteristics can be further improved.

The CoSnC-containing material has a phase containing tin Sn, cobalt Co, and carbon C and it is preferable that this phase has either a structure having small crystalline nature or an amorphous structure. In the CoSnC-containing material, it is preferable that at least a part of carbon serving as a component element has been coupled with the metal element or semimetal element serving as another component element. This is because although it is considered that the cycle characteristics deteriorate due to a cohesion or crystallization of tin or the like, since carbon is coupled with another element, such a cohesion or crystallization can be suppressed.

As a measuring method of examining a coupling state of the element, for example, an XPS (X-ray Photoelectron Spectroscopy) can be mentioned. In the XPS, a peak of a 1s orbit (C1s) of carbon appears at 284.5 eV in an apparatus in which, in the case of graphite, an energy has been calibrated so that a peak of a 4f orbit (Au4f) of a gold atom can be obtained at 84.0 eV. In the case of surface contamination carbon, the peak appears at 284.8 eV. On the other hand, in the case where a charge density of the carbon element is high, for example, in the case where carbon has been coupled with the metal element or semimetal element, the peak of C1s appears in an area lower than 284.5 eV. That is, in the case where a peak of a synthetic wave of C1s obtained with respect to the CoSnC-containing material appears in the area lower than 284.5 eV, at least a part of carbon contained in the CoSnC-containing material has been coupled with the metal element or semimetal element serving as another component element.

In the XPS measurement, for example, the peak of C1s is used for correction of an energy axis of a spectrum. Generally, since surface contamination carbon exists on the surface, the peak of C1s of surface contamination carbon is set to 284.8 eV and used as an energy reference. In the XPS measurement, since a waveform of the peak of C1s is obtained as a waveform including the peak of surface contamination carbon and the peak of carbon in the CoSnC-containing material, for example, by analyzing the waveform by using commercially available software, the peak of surface contamination carbon and the peak of carbon in the CoSnC-containing material are separated. In the analysis of the waveform, the position of the main peak existing on the lowest bound energy side is set to the energy reference (284.8 eV).

The anode active material layer 22B may contain another material such as conductive material, binder, viscosity adjusting agent, or the like which does not contribute to the charging. As a conductive material, graphite fiber, metal fiber, metal powder, or the like can be mentioned. As a binder, a high molecular compound of a fluorine system such as polyvinylidene fluoride, synthetic rubber such as styrene butadiene rubber or ethylene propylene diene rubber, or the like can be mentioned. As a viscosity adjusting agent, carboxymethyl cellulose or the like can be mentioned.

The separator 23 is used to isolate the cathode 21 and the anode 22 and allow lithium ions to pass while preventing a short-circuit of a current that is caused by a contact of the cathode and the anode.

The separator 23 is constructed by, for example, a porous membrane made of ceramics or a porous membrane made of a synthetic resin containing polyethylene and at least one kind selected from a group consisting of polypropylene, polyvinylidene fluoride, polytetrafluoro ethylene, $Al_2O_3$, $SiO_2$, aramid, and polyacrylonitrile other than polyethylene. Among them, a porous membrane made of polyolefin is preferable because it has an excellent short-circuit preventing effect and a safety of a battery can be improved owing to a shut-down effect. More specifically speaking, for example, a porous membrane can be formed by mixing a few kinds of polyethylene, polypropylene, and polytetrafluoro ethylene. A structure in which the surface of the porous membrane made of polyethylene, polypropylene, or polytetrafluoro ethylene has been coated with at least one of $Al_2O_3$, polyvinylidene fluoride, SiO2, aramid, and polyacrylonitrile can be also used. Further, a structure in which the porous membranes made of two or more kinds of polyethylene, polypropylene, and polytetrafluoro ethylene have been laminated can be also used.

An electrolytic solution serving as a liquid electrolyte has been impregnated in the separator 23. The electrolytic solution contains: a solvent; an electrolytic salt dissolved in the solvent; further, at lease one kind selected from a group consisting of an acid anhydride and its derivative; and a cyclic carbonic ester derivative having a halogen atom.

This is because since the separator contains an additive of at lease one kind selected from the group consisting of the acid anhydride and its derivative, a coating is formed on the surface of the anode 22 and a decomposition reaction of the electrolytic solution can be suppressed.

As an additive, a cyclic compound in which a ring contains a —C(=O)—O—C(=O)— radical is preferable. Specifically speaking, for example, the following compounds can be mentioned: succinic anhydride shown in (1-1) of Formula 1; glutaric anhydride shown in (1-2) of Formula 1; maleic anhydride shown in (1-3) of Formula 1; phthalic anhydride shown in (1-4) of Formula 1; 2-sulfobenzonic anhydride shown in (1-5) of Formula 1; citraconic anhydride shown in (1-6) of Formula 1; itaconic anhydride shown in (1-7) of Formula 1; diglycolic anhydride shown in (1-8) of Formula 1; hexafluoro glutaric anhydride shown in (1-9) of Formula 1; a phthalic anhydride derivative such as 3-fluorophthalic anhydride shown in (1-10) of Formula 1, 4-fluorophthalic anhydride shown in (1-11) of Formula 1, or the like; 3,6-epoxy-1,2,3,6-tetrahydro phthalic anhydride shown in (1-12) of Formula 1; 1,8-naphthalic anhydride shown in (1-13) of Formula 1; 2,3-naphthalene carboxylic anhydride shown in (1-14) of Formula 1; 1,2-cycloalkane dicarboxylic anhydride such as 1,2-cyclopentane dicarboxylic anhydride, 1,2-cyclohexane dicarboxylic anhydride, or the like; tetrahydro phthalic anhydride such as cis-1,2,3,6-tetrahydro phthalic anhydride, 3,4,5,6-tetrahydro phthalic anhydride, or the like; hexahydro phthalic anhydride (cis isomer, trans isomer); 3,4,5,6-tetrachloro phthalic anhydride; 1,2,4-benzene tricarboxylic anhydride; dipyromellitic anhydride; their derivatives; and the like.

[Formula 1]

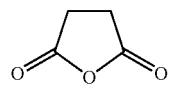

(1-1)

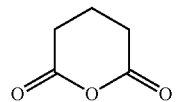

(1-2)

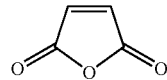

(1-3)

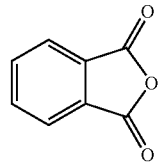

(1-4)

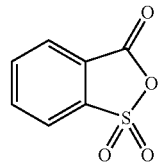

(1-5)

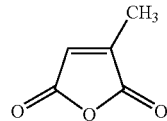

(1-6)

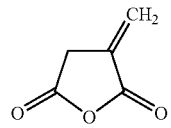

(1-7)

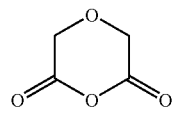

(1-8)

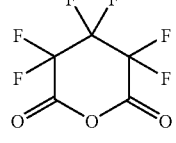

(1-9)

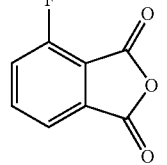

(1-10)

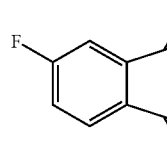

(1-11)

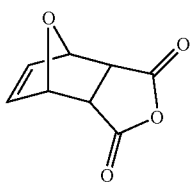
(1-12)

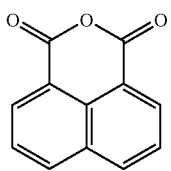
(1-13)

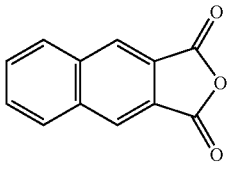
(1-14)

Such cyclic compounds can be formed, for example, by a method whereby the carboxylic acid and the carboxylic acid are dehydrated. A cyclic compound formed by a method whereby a compound of the carboxylic acid and the sulfonic acid, a compound of the sulfonic acid and the sulfonic acid, or the like is dehydrated may be used.

As cyclic carbonic ester derivative having the halogen atom, for example, 4-fluoro-1,3-dioxorane-2-one, 4,5-difluoro-1,3-dioxorane-2-one, 4-chloro-1,3-dioxorane-2-one, or 4-trifluoromethyl-1,3-dioxorane-2-one can be mentioned. Since the electrolytic solution contains the cyclic carbonic ester derivative having the halogen atom, a good coating is formed on the anode and decomposition of the solvent can be suppressed, so that the cycle characteristics can be improved.

In the electrolytic solution, further, a solvent containing a cyclic carbonic ester such as ethylene carbonate, propylene carbonate, or the like can be used. It is preferable to use one of ethylene carbonate and propylene carbonate, particularly, it is preferable to mix and use both of them. This is because the cycle characteristics can be improved. For example, any one, two, or more kinds of a cyclic carbonic ester having an unsaturated bond such as vinylene carbonate VC or the like shown by Formula 2 and its derivative may be contained.

[Formula 2]

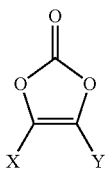

in the Formula, each of X and Y denotes an electron attractive group selected from a group consisting of hydrogen, a halogen radical, a cyano radical, and a nitro radical.

As a solvent, in addition to the above cyclic carbonic ester, it is preferable to further mix and use a chain-like carbonic ester such as diethyl carbonate, dimethyl carbonate, ethylmethyl carbonate, methylpropyl carbonate, or the like. This is because high ion conductivity can be obtained.

Besides them, the following material can be used as a solvent: butylene carbonate; γ-butyrolactone; γ-valerolactone; 1,2-dimethoxyethane; tetrahydrofuran; 2-methyl tetrahydrofuran; 1,3-dioxorane; 4-methyl-1,3-dioxorane; methyl acetate; methyl propionate; acetonitrile; glutaronitrile; adiponitrile; methoxy acetonitrile; 3-methoxy propylonitrile; N,N-dimethyl formamide; N-methyl pyrrolidinone; N-methyl oxazolidinone; N,N-dimethyl imidazolidinone; nitromethane; nitroethane; sulfolan; fluorobenzene; dimethyl sulfoxide; trimethyl phosphate; or the like.

As a solvent, one kind of material can be solely used or a plurality of kinds of materials can be also mixed and used. In the case of mixing and using a plurality of kinds of materials, it is preferable to mix and use a high dielectric constant solvent whose dielectric constant is equal to or larger than 30 and a low viscosity solvent whose viscosity is equal to or less than 1 mPa·s. This is because the high ion conductivity can be obtained.

As a high dielectric constant solvent, for example, a cyclic compound can be mentioned. A cyclic carbonic ester such as ethylene carbonate, propylene carbonate, or the like can be mentioned. The cyclic carbonic ester derivative having the halogen atom such as 4-fluoro-1,3-dioxorane-2-one, 4,5-difluoro-1,3-dioxorane-2-one, 4-chloro-1,3-dioxorane-2-one, 4-trifluoromethyl-1,3-dioxorane-2-one, or the like mentioned above is also a high dielectric constant solvent.

Among the cyclic carbonic ester derivatives each having the halogen atom, 4-fluoro-1,3-dioxorane-2-one or 4-chloro-1,3-dioxorane-2-one is much preferable and 4-fluoro-1,3-dioxorane-2-one is particularly preferable. This is because a reduction resistance is high and such a derivative is hard to be dissolved. As a low viscosity solvent, for example, a chain-like compound can be mentioned. A chain-like carbonic ester such as dimethyl carbonate, diethyl carbonate, methylethyl carbonate, or the like is preferable. With respect to the high dielectric constant solvent and the low viscosity solvent, one kind of material can be solely used or two or more kinds of materials can be also mixed and used.

The electrolytic salt contains $LiPF_6$. This is because the ion conductivity of the electrolytic solution can be raised by using $LiPF_6$.

It is preferable that, in the electrolytic solution, concentration of $LiPF_6$ lies within a range from 0.1 mol/kg or more to 2.0 mol/kg or less. This is because the ion conductivity can be further raised to a value within such a range.

As an electrolytic salt, another electrolytic salt can be mixed and used in addition to those electrolytic salts. As another electrolytic salt, for example, the following salt can be mentioned: $LiBF_4$; $LiAsF_6$; $LiClO_4$; $LiB(C_6H_5)4$; $LiCH_3SO_3$; $LiCF_3SO_3$; $LiC(SO_2CF_3)_3$; $LiAlCl_4$; $LiSiF_6$; LiCl; LiBr; an electrolytic salt shown by Formula 3; an electrolytic salt shown by Formula 4; an electrolytic salt shown by Formula 5; or the like.

[Formula 3]

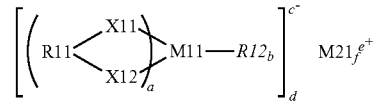

in the Formula: R11 denotes a —C(=O)—R21-C(=O)- radical (R21 indicates an alkylene radical, an alkylene halide radical, an allylene radical, or an allylene halide radical), a —C(=O)—C(R23)(R24)-radical (each of R23 and R24 indicates an alkyl radical, an alkyl halide radical, an aryl radical, or an aryl halide radical), or a —C(=O)—C(=O)— radical; R12 denotes a halogen radical, an alkyl radical, an alkyl halide radical, an aryl radical, or an aryl halide radical; each of X11 and X12 denotes oxygen O or sulfur S; M11 denotes a transition metal element or one of a Group-3B element, a Group-4B element, and a Group-5B element in the short period type periodic table; M21 denotes a Group-1A element or a Group-2A element in the short period type periodic table or aluminum Al; a indicates an integer of 1 to 4; b indicates an integer of 0 to 8; and each of c, d, e, and f indicates an integer of 1 to 3, respectively.

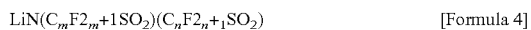
[Formula 4]

(in the Formula, m and n are integers of 1 or more)

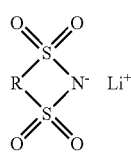
[Formula 5]

in the Formula, R indicates a linear-chain-like or branch-chain-like perfluoro alkylene radical of the carbon number 2 to 4.

As another electrolytic salt shown by Formula 3, for example, lithium difluoro [oxalato-O, O'] borate, lithium bis [oxalato-O, O'] borate, or the like can be mentioned. As another electrolytic salt shown by Formula 4, for example, $LiN(SO_2CF_3)_2$, $LiN(SO_2C_2F_5)_2$, $LiN(SO_2CF_3)(SO_2C_2F_5)$, $LiN(SO_2CF_3)(SO_2C_3F_7)$, $LiN(SO_2CF_3)(SO_2C_4F_9)$, or the like can be mentioned. As another electrolytic salt shown by Formula 5, for example, 1,2-perfluoroethane disulfonylimide lithium, 1,3-perfluoropropane disulfonylimide lithium, or the like can be mentioned.

As another electrolytic salt, one kind of material can be solely used or a plurality of kinds of materials can be also mixed and used.

The secondary battery has been designed so that an open circuit voltage (that is, battery voltage) in the perfect charging state lies within, for example, a range from 4.25V or more to 6.00V or less or a range from 4.25V or more to 4.60V or less. Therefore, even in the case of the same cathode active material, since a dedoping amount of lithium per unit mass is larger than that of a battery whose open circuit voltage in the perfect charging state is equal to 4.20V, an amount of cathode active material and an amount of anode active material are adjusted in accordance with the dedoping amount. Thus, the high energy density can be obtained.

The secondary battery can be manufactured, for example, by a method, which will be described hereinbelow. First, a cathode mixture is adjusted, for example, by mixing the foregoing cathode active material, conductive material, and binder, the cathode mixture is dispersed into the solvent such as N-methyl-2-pyrrolidone or the like, thereby forming a paste-like cathode mixture slurry. Subsequently, the cathode collector 21A is coated with the cathode mixture slurry, the solvent is dried, thereafter, the obtained collector is compression-molded by a roll pressing machine or the like, and the cathode active material layers 21B are formed. Thus, the cathode 21 is manufactured.

For example, the anode active material and binder are mixed and an anode mixture is adjusted. This anode mixture is dispersed into the solvent such as N-methyl-2-pyrrolidone or the like, thereby forming a paste-like anode mixture slurry. Subsequently, the anode collector 22A is coated with the anode mixture slurry, the solvent is dried, and thereafter, the obtained collector is compression-molded by the roll pressing machine or the like, thereby forming the anode active material layers 22B. Thus, the anode 22 is manufactured.

Subsequently, the cathode lead 25 is attached to the cathode collector 21A by welding or the like and the anode lead 26 is attached to the anode collector 22A by welding or the like. Thereafter, the cathode 21 and the anode 22 are wound through the separator 23, a front end portion of the cathode lead 25 is welded to the relief valve mechanism 15, a front end portion of the anode lead 26 is welded to the battery can 11, and the wound cathode 21 and anode 22 are sandwiched by the pair of insulating plates 12 and 13 and enclosed in the battery can 11. After the cathode 21 and the anode 22 were enclosed in the battery can 11, the electrolytic solution is injected into the battery can 11 and impregnated into the separator 23. Thereafter, the battery cap 14, relief valve mechanism 15, and PTC element 16 are caulked through the gasket 17 and fixed to the open end portion of the battery can 11. Thus, the secondary battery shown in FIG. 1 is formed.

In the secondary battery, when the charge is performed, for example, lithium ions are dedoped from the cathode active material layer 21B. The lithium ions are doped into the anode active material layer 22B through the electrolytic solution. When the discharge is performed, for example, the lithium ions are dedoped from the anode active material layer 22B. The lithium ions are doped into the cathode active material layer 21 B through the electrolytic solution.

As mentioned above, according to the first embodiment, since the open circuit voltage in the full charging state has been set to the value within the range from 4.25V or more to 6.00V or less, the high energy density can be obtained. Since the acid anhydride or its derivative is contained as an additive in the electrolytic solution, the coating is formed on the anode 22 and the decomposition of the electrolytic solution can be suppressed. Thus, battery characteristics such as high temperature cycle characteristics, high temperature preserving characteristics, and the like can be improved.

Particularly, if a content of the additive in the electrolytic solution is set to a value within a range from 0.001 mass % or more to 10 mass % or less, a range from 0.1 mass % or more to 10 mass % or less, or further, a range from 0.005 mass % or more to 4 mass % or less, a higher effect can be obtained. If a cyclic carbonic ester derivative having the halogen atom is contained in the electrolytic solution, a higher effect can be obtained.

Since the separator contains at least one of polypropylene, polyvinylidene fluoride, polytetrafluoro ethylene, $Al_2O_3$, $SiO_2$, aramid, and polyacrylonitrile other than polyethylene, an oxidation decomposition of the separator which is physically come into contact with the cathode upon continuous charging is suppressed and the sudden current leading can be blocked.

Therefore, the energy density can be raised and continuous charging characteristics can be improved.

Second Embodiment

Figure 3:
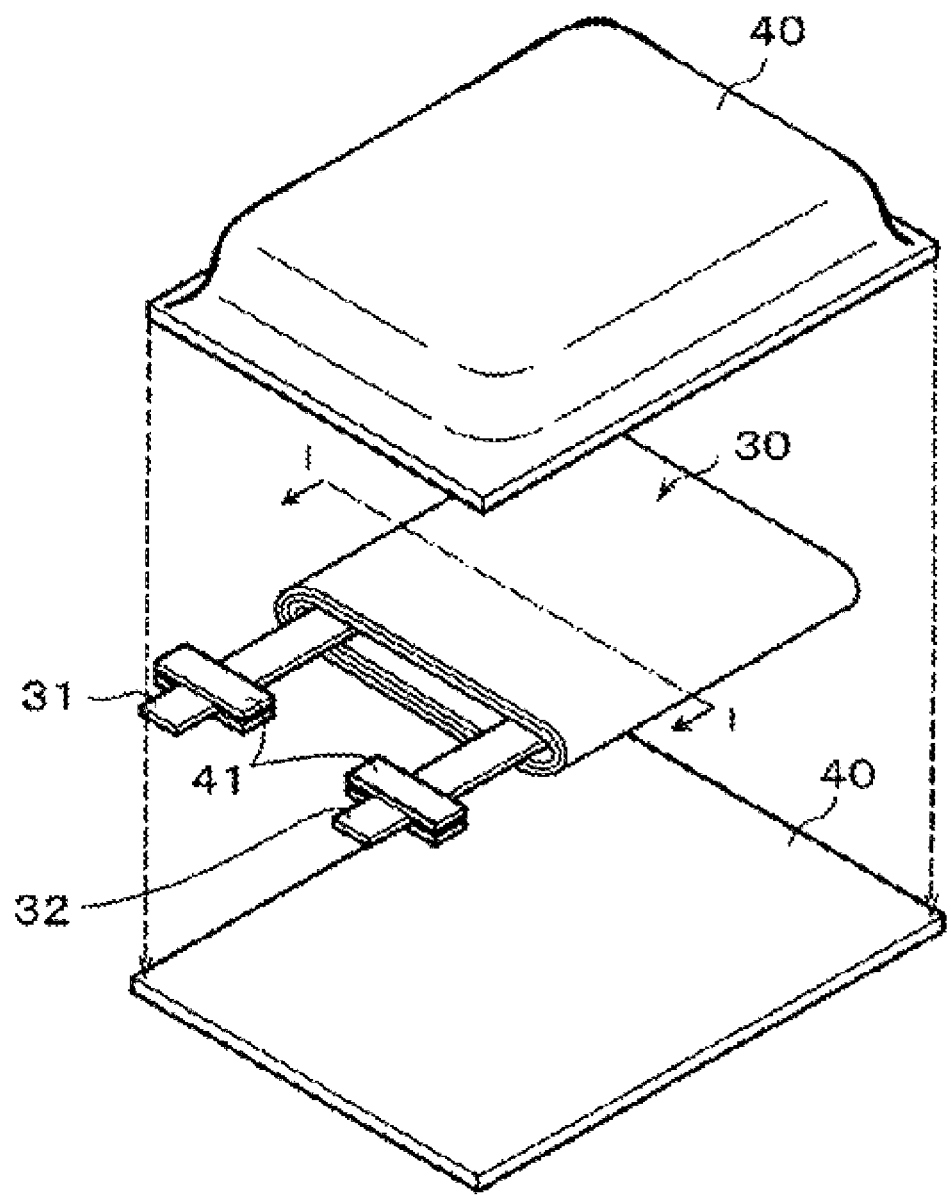
FIG. 3 is a cross sectional view showing a construction of a battery according to the second embodiment.

FIG. 3 shows a construction of a secondary battery according to the second embodiment. This secondary battery is what is called a laminate film type. A winded electrode member 30 to which a cathode lead 31 and an anode lead 32 have been attached is enclosed in a film-like sheathing member 40.

The cathode lead 31 and anode lead 32 are directed from the inside toward the outside of the sheathing member 40 and are led out, for example, in the same direction. Each of the cathode lead 31 and anode lead 32 is made of, for example, a metal material such as aluminum, copper, nickel, stainless steel, or the like and has a thin-plate shape or a mesh shape.

The sheathing member 40 is constructed by, for example, a rectangular aluminum laminate film obtained by adhering a nylon film, aluminum foil, and a polyethylene film in this order. The sheathing member 40 is arranged so that, for example, the polyethylene film side and the winded electrode member 30 face, and their outer edge portions have mutually and closely been adhered by welding or with an adhesive agent. An adhesive film 41 has been inserted between the sheathing member 40 and the cathode lead 31 and another adhesive film 41 has also similarly been inserted between the sheathing member 40 and the anode lead 32 in order to prevent the invasion of the outside air. The adhesive film 41 is made of a material having adhesion to the cathode lead 31 and anode lead 32, for example, a polyolefin resin such as polyethylene, polypropylene, denatured polyethylene, denatured polypropylene, or the like.

The sheathing member 40 may be constructed by a laminate film having another structure, a high molecular film made of polypropylene or the like, or a metal film in place of the foregoing aluminum laminate film.

Figure 4:
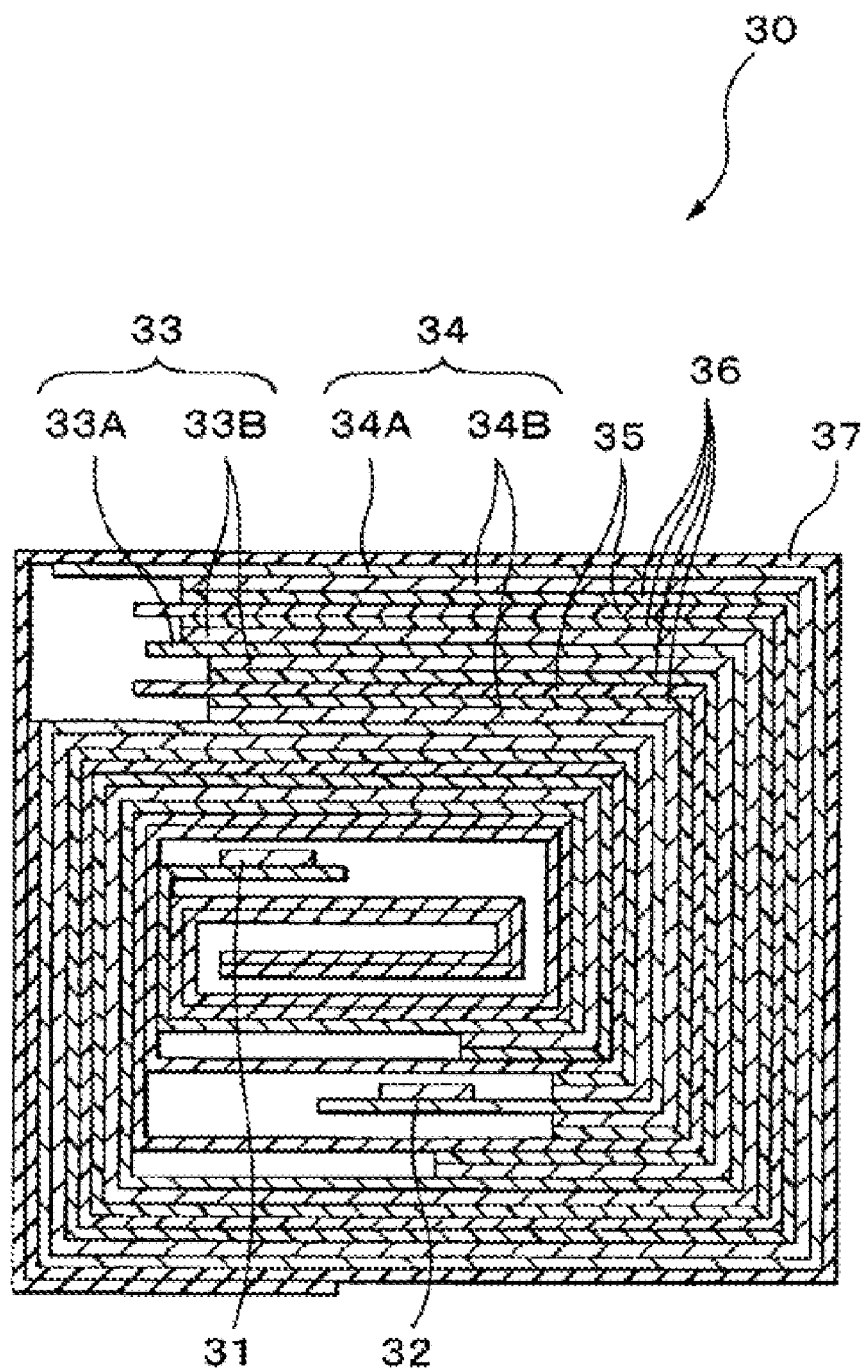
FIG. 4 is a cross sectional view taken along the line I-I of a winded electrode member shown in FIG. 3.

FIG. 4 shows a cross sectional structure taken along the I-I line in the winded electrode member 30 shown in FIG. 3. The winded electrode member 30 is constructed in such a manner that a cathode 33 and an anode 34 are laminated through a separator 35 and an electrolyte layer 36 and wound and the outermost peripheral portion is protected by a protecting tape 37.

The cathode 33 has a structure in which a cathode active material layer 33B or cathode active material layers 33B is/are provided for one surface or both surfaces of a cathode collector 33A. The anode 34 has a structure in which an anode active material layer 34B or anode active material layers 34B is/are provided for one surface or both surfaces of an anode collector 34A. The cathode 33 and the anode 34 are arranged so that the cathode active material layer 33B and the anode active material layer 34B face each other. Constructions of the cathode collector 33A, cathode active material layer 33B, anode collector 34A, anode active material layer 34B, and separator 35 are similar to those of the cathode collector 21A, cathode active material layer 21B, anode collector 22A, anode active material layer 22B, and separator 23 described in the first embodiment.

The electrolyte layer 36 includes an electrolytic solution and a high molecular compound serving as a holder to hold the electrolytic solution according to the embodiment and is in what is called a gel-state. The gel-like electrolyte is preferable because the high ion conductivity can be obtained and a leakage of the solution of the battery can be prevented. As a high molecular material, for example, there can be mentioned: a high molecular compound of an ether system such as polyethylene oxide, bridge member containing polyethylene oxide, or the like; a high molecular compound of an ester system such as polymethacrylate or the like or a high molecular compound of an acrylate system; or a polymer of vinylidene fluoride such as polyvinylidene fluoride, a copolymer of vinylidene fluoride and hexafluoro propylene, or the like. Any one of those compounds is used or two or more kinds of them are mixed and used. Particularly, it is preferable to use the high molecular compound of a fluorine system such as a polymer of vinylidene fluoride or the like from a viewpoint of the oxidation reduction stability.

This secondary battery can be manufactured, for example, as follows. First, each of the cathode 33 and the anode 34 is coated with a presolution containing the electrolytic solution, the high molecular compound, and a mixed solvent, and the mixed solvent is volatilized, thereby forming the electrolyte layer 36. After that, the cathode lead 31 is attached to an end portion of the cathode collector 33A by welding. The anode lead 32 is also attached to an end portion of the anode collector 34A by welding. Subsequently, the cathode 33 and anode 34 on each of which the electrolyte layer 36 has been formed are laminated through the separator 35, thereby obtaining a laminate. After that, this laminate is wound in its longitudinal direction and the protecting tape 37 is adhered onto the outermost peripheral portion, thereby forming the winded electrode member 30. Finally, for example, the winded electrode member 30 is sandwiched between the sheathing members 40 and the outer edge portions of the sheathing members 40 are closely adhered by thermal melt-bonding or the like, thereby sealing the winded electrode member 30. In this instance, the adhesive film 41 has been inserted between the cathode lead 31 and the sheathing member 40 and another adhesive film 41 has also similarly been inserted between the anode lead 32 and the sheathing member 40. Thus, the secondary battery shown in FIGS. 3 and 4 is completed.

The secondary battery may be manufactured as follows. First, as mentioned above, the cathode 33 and the anode 34 are manufactured, the cathode lead 31 is attached to the cathode 33, the anode lead 32 is attached to the anode 34, thereafter, the cathode 33 and anode 34 are laminated through the separator 35 and wound, the protecting tape 37 is adhered onto the outermost peripheral portion, thereby forming a winded element as a precursor of the winded electrode member 30. Subsequently, the winded element is sandwiched between the sheathing members 40, the outer peripheral portions excluding one side is thermally melt-bonded in a bag-shaped, and the winded electrode member 30 is enclosed in the sheathing member 40. Subsequently, a composition for the electrolyte containing an electrolytic solution, a monomer as a raw material of the high molecular compound, a polymerization initiator, and another material such as a polymerization inhibitor or the like as necessary is prepared and injected into the sheathing member 40.

After the composition for the electrolyte was injected, an opening portion of the sheathing member 40 is thermally melt-bonded under the vacuum atmosphere, thereby sealing the winded electrode member 30. Subsequently, the monomer is polymerized by applying heat so as to form a high molecular compound, thereby forming the gel-like electrolyte layer 36. In this manner, the secondary battery shown in FIGS. 3 and 4 is assembled.

Functions and effects of this secondary battery are similar to those of the secondary battery according to the first embodiment. That is, since the acid anhydride or its derivative is contained in the electrolytic solution, the decomposition of the electrolytic solution can be suppressed.

EXAMPLES

Specific Examples of the application will be explained in detail with reference to FIGS. 1 and 2. However, the application is not limited only to those Examples.

Example 1

The secondary battery shown in FIG. 1 is manufactured as will be described hereinbelow. First, lithium carbonate of 0.5 mol and cobalt carbonate of 1 mol are mixed and the mixed matter is baked at 890° C. for 5 hours under the air atmosphere, thereby synthesizing a lithium cobalt composite oxide $LiCoO_2$ serving as a cathode active material. After that, the lithium cobalt composite oxide is powdered so that its mean diameter is equal to 10 μm.

An X-ray diffraction measurement is performed with respect to the obtained lithium cobalt composite oxide, so that it has been found that an obtained spectrum fairly coincides with a spectrum of the lithium cobalt composite oxide $LiCoO_2$ registered in the JCPDS file. The surface of a core particle of this $LiCoO_2$ is covered with a microparticle of $LiMn_{0.5}Ni_{0.5}O_2$ by the high speed rotational impact blending, thereby manufacturing a composite particle of $LiCoO_2$.

Subsequently, the lithium cobalt composite oxide of 94 mass %, ketjen black (amorphous carbon powder) of 3 mass % serving as a conductive material, and polyvinylidene fluoride of 3 mass % serving as a binder are mixed and dispersed into N-methyl-2-pyrrolidone serving as a solvent, thereby obtaining a cathode mixture slurry. Subsequently, both surfaces of the cathode collector 21A made by the belt-shaped aluminum foil having a thickness of 20 μm are uniformly coated with the cathode mixture slurry, the collector is dried and compression molded, and the cathode active material layers 21B are formed, thereby manufacturing the cathode 21. After that, the cathode lead 25 made of aluminum is attached to one end of the cathode collector 21A.

A granular graphite powder of 90 mass % having a mean diameter of 30 μm as an anode active material and polyvinylidene fluoride of 10 mass % as a binder are mixed and dispersed into N-methyl-2-pyrrolidone serving as a solvent, thereby obtaining a anode mixture slurry.

Subsequently, both surfaces of the anode collector 22A made by the belt-shaped copper foil having a thickness of 15 μm are uniformly coated with the anode mixture slurry, the collector is dried and compression molded, and the anode active material layers 22B are formed, thereby manufacturing the anode 22. In this instance, the battery is designed so that the open circuit voltage (that is, battery voltage) in the perfect charging state is equal to 4.35V by adjusting an amount of cathode active material and an amount of anode active material. After that, the anode lead 26 made of nickel is attached to one end of the anode collector 22A.

After the cathode 21 and anode 22 were manufactured, the separator 23 made by a microporous membrane is prepared. The anode 22, separator 23, cathode 21, and separator 23 are laminated in this order, thereby forming a laminate. This laminate is wound a number of times in a spiral shape, thereby manufacturing the winded electrode member 20 having an outer diameter of 17.8 mm of a jerry roll type. In this instance, as a separator 23, a separator having a triple layer (PP/PE/PP) structure in which polypropylene PP, polyethylene PE, and polypropylene PP have sequentially been laminated is used.

After the winded electrode member 20 was manufactured, the winded electrode member 20 is sandwiched between the pair of insulating plates 12 and 13. The anode lead 26 is welded to the battery can 11. The cathode lead 25 is welded to the relief valve mechanism 15. The winded electrode member 20 is enclosed in the battery can 11 made of nickel-plated iron. Subsequently, an electrolytic solution is injected into the battery can 11 by a reduction system. As an electrolytic solution, a solution obtained by adding succinic anhydride of 1 mass % into a mixed solvent in which 4-fluoro-1,3-dioxorane-2-one, ethylene carbonate, propylene carbonate, dimethyl carbonate, and ethylmethyl carbonate have been mixed at a weight ratio of (5:20:5:65:5) is used. Concentration of $LiPF_6$ in the electrolytic solution is set to 1.0 mol/kg.

After that, the battery cap 14 is caulked to the battery can 11 through the gasket 17, thereby manufacturing a cylindrical secondary battery of Example 1 having a diameter of 18 mm and a height of 65 mm.

<Comparison 1>

A secondary battery of Comparison 1 is manufactured in a manner similar to that of Example 1 except that a mixed solvent in which ethylene carbonate, propylene carbonate, dimethyl carbonate, and ethylmethyl carbonate have been mixed at a weight ratio of (25:5:65:5) is used in place of the mixed solvent used in Example 1 and succinic anhydride is not added.

<Comparison 2>

A secondary battery of Comparison 2 is manufactured in a manner similar to that of Example 1 except that succinic anhydride is not added.

<Comparison 3>

A secondary battery of Comparison 3 is manufactured in a manner similar to that of Example 1 except that 4-fluoro-1,3-dioxorane-2-one is not added.

With respect to the secondary batteries of Example 1 and Comparisons 1 to 3, cycle characteristics are evaluated as follows.

A constant current and constant voltage charge is performed at a charging voltage of 4.35V and a constant current of 1500 mA in an environment of 25° C. Subsequently, a constant current discharge is performed at a constant current of 1500 mA until a battery voltage reaches 3V. Such charge and discharge are repeated and a discharge capacitance maintaining ratio to a discharge capacitance at the first cycle is obtained as (discharge capacitance at a certain cycle/discharge capacitance at the first cycle)×100%.

Figure 5A:
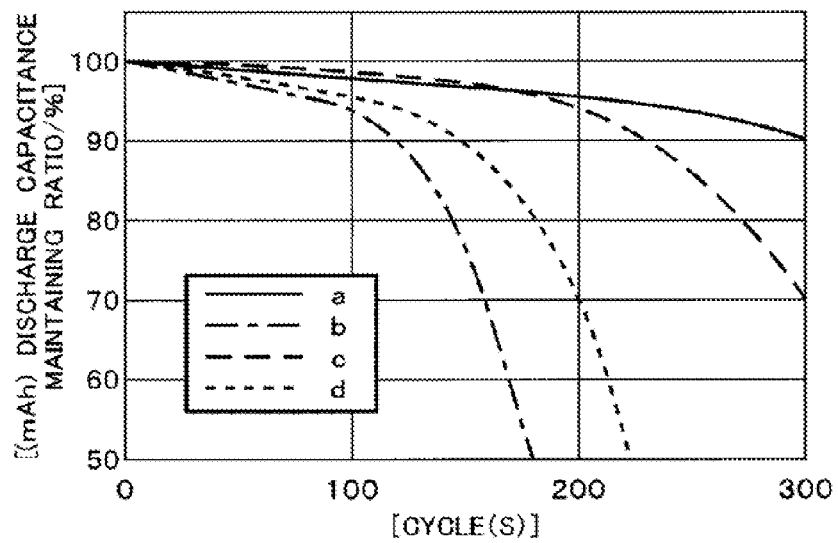
FIGS. 5A and 5B are graphs obtained by plotting a discharge capacitance maintaining ratio to the number of charge/discharge cycles in each of Examples 1 and 2 and Comparisons 1 to 6.

With respect to the obtained results, a graph is formed by plotting the discharge capacitance maintaining ratios to the number of charge/discharge cycles, thereby evaluating. The graph formed by plotting the discharge capacitance maintaining ratios to the number of charge/discharge cycles is shown in FIG. 5A. In FIG. 5A, a line a shows the measurement result of Example 1, a line b shows the measurement result of Comparison 1, a line c shows the measurement result of Comparison 2, and a line d shows the measurement result of Comparison 3.

As shown in FIG. 5A, it has been found that the cycle characteristics can be remarkably improved by containing succinic anhydride and 4-fluoro-1,3-dioxorane-2-one in the electrolytic solution.

It is considered that the reason why the cycle characteristics are improved is that since 4-fluoro-1,3-dioxorane-2-one forms the good coating onto the anode and the decomposition of the solvent is suppressed, an inclination in the early cycle is improved and the cycle characteristics are improved. It is also considered that the reason is that since the coating which is stronger than 4-fluoro-1,3-dioxorane-2-one is formed onto the anode by succinic anhydride, the decomposition of the solvent on the anode can be suppressed more than that in the case of 4-fluoro-1,3-dioxorane-2-one.

It is also considered that the reason is that since the cathode is coated with the $LiMn_{0.5}Ni_{0.5}O_2$ microparticle by the high speed rotational impact blending, the reaction between the electrolytic solution and the cathode can be further suppressed. It is further considered that by using the triple-layer separator as a separator, the deterioration of the separator can be further suppressed.

Example 2

A secondary battery of Example 2 is manufactured in a manner similar to that of Example 1 except that a mixed solvent in which 4,5-difluoro-1,3-dioxorane-2-one, ethylene carbonate, propylene carbonate, dimethyl carbonate, and ethylmethyl carbonate have been mixed at a weight ratio of (5:20:5:65:5) is used in place of the mixed solvent used in Example 1.

<Comparison 4>

A secondary battery of Comparison 4 is manufactured in a manner similar to that of Example 2 except that a mixed solvent in which ethylene carbonate, propylene carbonate, dimethyl carbonate, and ethylmethyl carbonate have been mixed at a weight ratio of (25:5:65:5) is used in place of the mixed solvent used in Example 2 and succinic anhydride is not added.

<Comparison 5>

A secondary battery of Comparison 5 is manufactured in a manner similar to that of Example 2 except that succinic anhydride is not added.

<Comparison 6>

A secondary battery of Comparison 6 is manufactured in a manner similar to that of Example 2 except that 4,5-difluoro-1,3-dioxorane-2-one is not added.

Figure 5B:
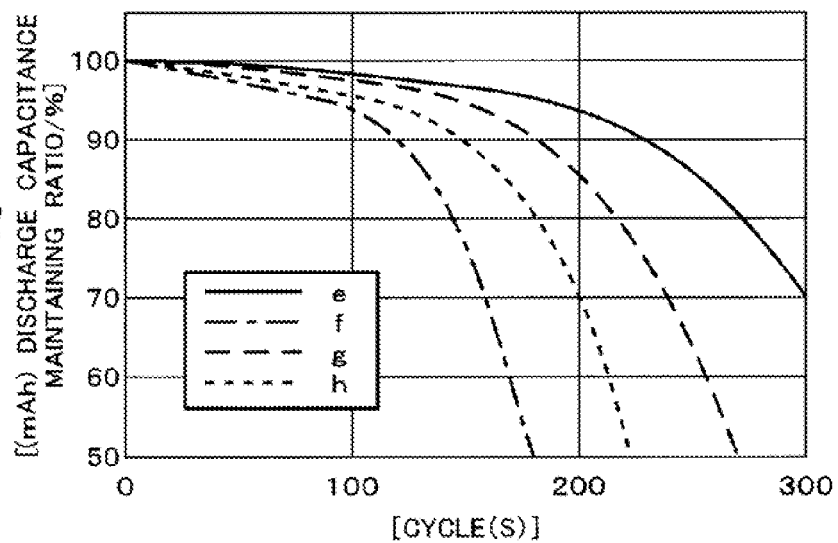

With respect to the secondary batteries of Example 2 and Comparisons 4 to 6, discharge capacitance maintaining ratios are measured in a manner similar to Example 1 and Comparisons 1 to 3. With respect to measurement results, a graph is formed by plotting the discharge capacitance maintaining ratios to the number of charge/discharge cycles and cycle characteristics are evaluated. The graph formed by plotting the discharge capacitance maintaining ratios to the number of charge/discharge cycles is shown in FIG. 5B. In FIG. 5B, a line e shows the measurement result of Example 2, a line f shows the measurement result of Comparison 4, a line g shows the measurement result of Comparison 5, and a line h shows the measurement result of Comparison 6.

As shown in FIG. 5B, it has been found that the cycle characteristics can be remarkably improved by containing succinic anhydride and 4,5-difluoro-1,3-dioxorane-2-one in the electrolytic solution.

Example 3

A secondary battery of Example 3 is manufactured in a manner similar to that of Example 1 except that 2-sulfobenzonic anhydride is used in place of succinic anhydride.

<Comparison 7>

A secondary battery of Comparison 7 is manufactured in a manner similar to that of Example 3 except that a mixed solvent in which ethylene carbonate, propylene carbonate, dimethyl carbonate, and ethylmethyl carbonate have been mixed at a weight ratio of (25:5:65:5) is used in place of the mixed solvent used in Example 3 and 2-sulfobenzonic anhydride is not added.

<Comparison 8>

A secondary battery of Comparison 8 is manufactured in a manner similar to that of Example 3 except that 2-sulfobenzonic anhydride is not added.

<Comparison 9>

A secondary battery of Comparison 9 is manufactured in a manner similar to that of Example 3 except that 4-fluoro-1,3-dioxorane-2-one is not added.

Figure 6A:
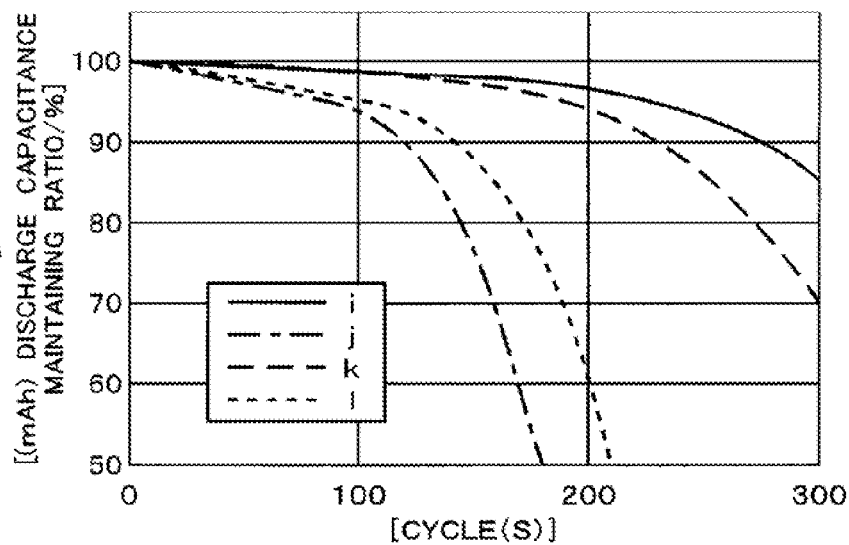
FIGS. 6A and 6B are graphs obtained by plotting a discharge capacitance maintaining ratio to the number of charge/discharge cycles in each of Examples 1 and 3 to 6 and Comparisons 2 and 7 to 9.

With respect to the secondary batteries of Example 3 and Comparisons 7 to 9, discharge capacitance maintaining ratios are measured in a manner similar to Example 1 and Comparisons 1 to 3. With respect to measurement results, a graph is formed by plotting the discharge capacitance maintaining ratios to the number of charge/discharge cycles and cycle characteristics are evaluated. The graph formed by plotting the discharge capacitance maintaining ratios to the number of charge/discharge cycles is shown in FIG. 6A. In FIG. 6A, a line i shows the measurement result of Example 3, a line j shows the measurement result of Comparison 7, a line k shows the measurement result of Comparison 8, and a line l shows the measurement result of Comparison 9.

As shown in FIG. 6A, it has been found that the cycle characteristics can be remarkably improved by containing 2-sulfobenzonic anhydride and 4-fluoro-1,3-dioxorane-2-one in the electrolytic solution.

Example 4

A secondary battery of Example 4 is manufactured in a manner similar to that of Example 1 except that a content of succinic anhydride is set to 0.1 mass %.

Example 5

A secondary battery of Example 5 is manufactured in a manner similar to that of Example 1 except that a content of succinic anhydride is set to 5 mass %.

Example 6

A secondary battery of Example 6 is manufactured in a manner similar to that of Example 1 except that a content of succinic anhydride is set to 10 mass %.

Figure 6B:
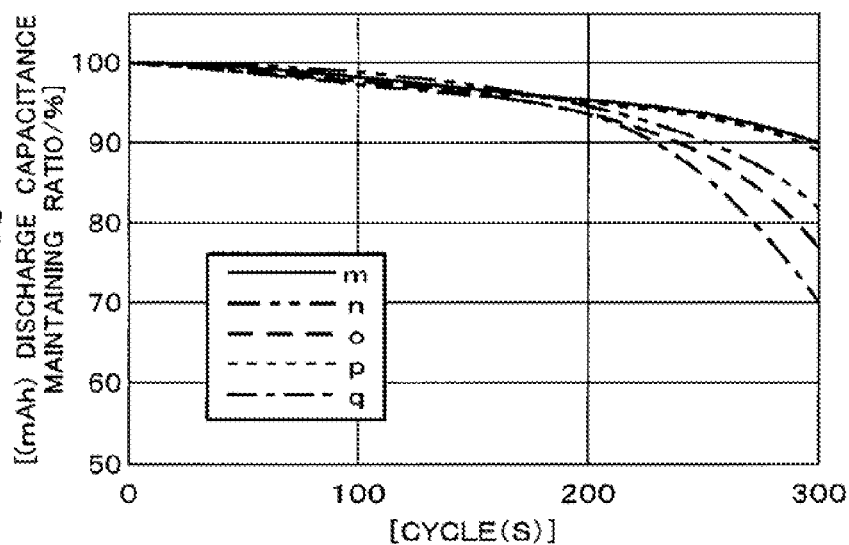

With respect to the secondary batteries of Examples 4 to 6, discharge capacitance maintaining ratios are measured in a manner similar to Example 1 and Comparisons 1 to 3. With respect to measurement results, a graph is formed by plotting the discharge capacitance maintaining ratios to the number of charge/discharge cycles and cycle characteristics are evaluated. The graph formed by plotting the discharge capacitance maintaining ratios to the number of charge/discharge cycles is shown in FIG. 6B. In FIG. 6B, the graph of Example 1 and Comparison 2 is also shown, a line m shows the measurement result of Example 1, a line o shows the measurement result of Example 4, a line p shows the measurement result of Example 5, a line n shows the measurement result of Example 6, and a line q shows the measurement result of Comparison 2.

As shown in FIG. 6B, it has been found that the good cycle characteristics can be obtained by containing 4-fluoro-1,3-dioxorane-2-one and succinic anhydride of an amount within a range from 0.1 weight % to 10 weight % in the electrolytic solution.

Although the present application has been described above by mentioning the embodiments and Examples, the present application is not limited to the foregoing embodiments and Examples. It should be understood by those skilled in the art that various modifications, combinations, sub-combinations and alterations may occur depending on design requirements and other factors insofar as they are within the scope of the appended claims or the equivalents thereof. For example, although the secondary batteries having the winded structure have been described in the foregoing embodiments and Examples, the application can be also similarly applied to a secondary battery having a structure in which the cathode and anode have been folded or laminated. In addition, the present application can be also similarly applied to a secondary battery of what is called a coin type, a button type, a rectangular type, a laminate film type, or the like.

Further, in the foregoing embodiments and Examples, what is called a lithium ion secondary battery in which the capacitance of the anode is expressed by a capacitance component due to the doping and dedoping of lithium has been described. However, the present application can be also similarly applied to: what is called a lithium metal secondary battery in which a lithium metal is used as an anode active material and the capacitance of the anode is expressed by a capacitance component due to the precipitation and dissolution of lithium; or a secondary battery in which by setting a charge capacitance of the anode material which can dope and dedope lithium to be smaller than the charge capacitance of the cathode, the capacitance of the anode includes a capacitance component due to the doping and dedoping of lithium and the capacitance component due to the precipitation and dissolution of lithium and is expressed by the sum of them.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A battery comprising a cathode, an anode, an electrolytic solution, and a separator,
   wherein an open circuit voltage per pair of said cathode and said anode in a full charging state lies within a range from 4.25V or more to 6.00V or less,
   said electrolytic solution contains: an additive selected from the group consisting of an acid anhydride and its derivative; and a cyclic carbonic ester derivative having a halogen atom,
   said cathode includes a cathode material in which a surface of a lithium cobaltate particle is covered with a microparticle of a lithium composite oxide selected from the group consisting of: $Li_xCo_2$, $Li_xNiO_2$, $Li_xMn_2O_4$, $Li_xCo_{1-y}M_yO_2$, $Li_xNi_{1-y}M_yO_2$, $Li_xMn_{1-y}M_yO_2$ and $LiM5PO_4$, wherein $0<x\leq1.2$, $0<y<1$, $0.9\leq z\leq1.1$, M denotes an element of at least one kind selected from the group consisting of titanium (Ti), vanadium (V), chromium (Cr), manganese (Mn), iron (Fe), aluminum (Al), cobalt (Co), nickel (Ni), copper (Cu), zinc (Zn), molybdenum (Mo), bismuth (Bi), and boron (B), and M5 represents at least one kind selected from a group consisting of cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W), and zirconium (Zr), and
   said electrolytic solution contains 5 wt % of the cyclic carbonic ester derivative having a halogen atom, 20 wt % of ethylene carbonate, 5 wt % of propylene carbonate, 65 wt % of dimethyl carbonate and 5 wt % of ethylmethyl carbonate.

2. The battery according to claim 1, wherein said separator comprises:
   polyethylene; and
   at least one component selected from the group consisting of polypropylene, polyvinylidene fluoride, polytetrafluoro ethylene, $Al_2O_3$, $SiO_2$, aramid, and polyacrylonitrile.

3. The battery according to claim 1, wherein said electrolytic solution contains said additive of an amount within a range from 0.001 mass % or more to 10 mass % or less.

4. The battery according to claim 1, wherein said cyclic carbonic ester derivative having said halogen atom is at least either 4-fluoro-1,3-dioxorane-2-one or 4,5-difluoro-1,3-dioxorane-2-one.

5. The battery according to claim 1, wherein said electrolytic solution further contains at least one kind selected from a group consisting of compounds expressed by Formulae 1, 2, 3, and 4:

[Formula 1]

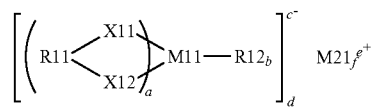

wherein R11 denotes a —C(═O)-R21-C(═O)-radical, where R21 indicates an alkylene radical, an alkylene halide radical, an allylene radical, or an allylene halide radical), a —C(═O)—C(R23)(R24)-radical (each of R23 and R24 indicates an alkyl radical, an alkyl halide radical, an aryl radical, or an aryl halide radical, or a —C(═O)—C(═O)-radical; wherein R12 denotes a halogen radical, an alkyl radical, an alkyl halide radical, an aryl radical, or an aryl halide radical; each of X11 and X12 denotes oxygen O or sulfur S; wherein M11 denotes a transition metal element or one of a Group-3B element, a Group-4B element, and a Group-5B element in a short period type periodic table; and wherein M21 denotes a Group-1A element or a Group-2A element in a short period type periodic table or aluminum; a indicates an integer of 1 to 4; b indicates an integer of 0 to 8; and each of c, d, e, and f indicates an integer of 1 to 3, respectively;

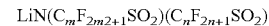  [Formula 2]

where m and n are integers of 1 or more;

[Formula 3]

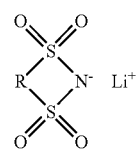

where R indicates a linear-chain-type or branch-chain-type perfluoro alkylene radical of the carbon number 2 to 4); and

[Formula 4]

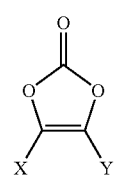

where each of X and Y denotes an electron attractive group selected from a group consisting of hydrogen, a halogen radical, a cyano radical, and a nitro radical.

6. The battery according to claim 1, wherein the anode comprises a CoSnC-containing material as an anode active material.

7. The battery according to claim 1, wherein said electrolytic solution further contains $LiPF_6$ in a concentration of 1.0 mol/kg of electrolytic solution.

8. The battery according to claim 1, wherein said cathode material is one in which a surface of a lithium cobaltate particle is covered with a microparticle of a lithium composite oxide selected from the group consisting of: $Li_xCo_2$, $Li_xNiO_2$, $Li_xMn_2O_4$ and $LiM5PO_4$, wherein $0<x\leq1.2$, $0<y<1$, $0.9\leq z\leq1.1$ and M5 represents at least one kind selected from a group consisting of cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W), and zirconium (Zr).

* * * * *